United States Patent
Baugher (10) Patent No.: US 9,703,886 B2
(45) Date of Patent: Jul. 11, 2017

(54) FORMATTING A USER NETWORK SITE BASED ON USER PREFERENCES AND FORMAT PERFORMANCE DATA

(75) Inventor: Alexandra Baugher, San Carlos, CA (US)

(73) Assignee: Google Inc., Mountain View, CA (US)

(*) Notice: Subject to any disclaimer, the term of this patent is extended or adjusted under 35 U.S.C. 154(b) by 693 days.

(21) Appl. No.: 12/576,796

(22) Filed: Oct. 9, 2009

(65) Prior Publication Data
US 2010/0106595 A1    Apr. 29, 2010

Related U.S. Application Data

(63) Continuation of application No. 11/288,431, filed on Nov. 29, 2005, now Pat. No. 7,603,619.

(51) Int. Cl.
*G06F 17/00* (2006.01)
*G06F 17/30* (2006.01)
*G06Q 30/02* (2012.01)

(52) U.S. Cl.
CPC ..... *G06F 17/3089* (2013.01); *G06Q 30/0243* (2013.01); *G06Q 30/0258* (2013.01)

(58) Field of Classification Search
CPC .. G06F 17/211; G06F 17/212; G06F 17/2247; G06F 17/24; G06F 17/248; G06F 17/3089; G06Q 30/0242; G06Q 30/0254; G06Q 30/0277; H04L 67/02
USPC ............ 715/234, 253, 255–272, 243, 760; 705/14.4, 14.41–14.49, 14.5, 14.51–14.59, 705/14.6, 14.61–14.69, 14.7, 14.71–14.73; 709/224
See application file for complete search history.

(56) References Cited

U.S. PATENT DOCUMENTS

| | | |
|---|---|---|
| 5,636,346 A | 6/1997 | Saxe |
| 5,724,521 A | 3/1998 | Dedrick |
| 5,734,915 A | 3/1998 | Roewer |
| 5,740,549 A | 4/1998 | Reilly et al. |
| 5,845,265 A | 12/1998 | Woolston |
| 5,848,397 A | 12/1998 | Marsh et al. |
| 5,918,010 A | 6/1999 | Appleman et al. |
| 5,920,854 A | 7/1999 | Kirsch et al. |
| 5,931,901 A | 8/1999 | Wolfe et al. |

(Continued)

FOREIGN PATENT DOCUMENTS

| | | |
|---|---|---|
| WO | WO 97/21183 | 6/1997 |
| WO | WO9721183 A1 | 6/1997 |

(Continued)

OTHER PUBLICATIONS

Doyle, K. et al.,"Banner Ad Placement Study," © 2001, Univ. of Michigan & webreference.com, 3 pages.*

(Continued)

*Primary Examiner* — Cesar Paula
*Assistant Examiner* — James H Blackwell
(74) *Attorney, Agent, or Firm* — Fish & Richardson P.C.

(57) ABSTRACT

A system and method for formatting an electronic document. Format preference information related to the format of a user network site associated with a user is received. Document format criteria based on the format preference information and format performance information is automatically determined. An electronic document associated with the user network site is output according to the document format criteria.

19 Claims, 6 Drawing Sheets

(56) References Cited

U.S. PATENT DOCUMENTS

| | | |
|---|---|---|
| 5,948,061 A | 9/1999 | Merriman et al. |
| 5,974,398 A | 10/1999 | Hanson et al. |
| 6,012,071 A | 1/2000 | Krishna et al. |
| 6,026,368 A | 2/2000 | Brown et al. |
| 6,044,375 A | 3/2000 | Shmueli et al. |
| 6,044,376 A | 3/2000 | Kurtzman |
| 6,061,659 A | 5/2000 | Murray |
| 6,067,570 A | 5/2000 | Kreynin et al. |
| 6,078,866 A | 6/2000 | Buck et al. |
| 6,078,914 A | 6/2000 | Redfern |
| 6,144,944 A | 11/2000 | Kurtzman et al. |
| 6,167,382 A | 12/2000 | Sparks et al. |
| 6,223,163 B1 | 4/2001 | Van Luchene |
| 6,247,009 B1 | 6/2001 | Shiiyama et al. |
| 6,253,189 B1 | 6/2001 | Feezell et al. |
| 6,269,361 B1 | 7/2001 | Davis et al. |
| 6,285,987 B1 | 9/2001 | Roth et al. |
| 6,298,348 B1 | 10/2001 | Eldering |
| 6,324,519 B1 | 11/2001 | Eldering |
| 6,336,132 B2 | 1/2002 | Appleman et al. |
| 6,401,075 B1 | 6/2002 | Mason et al. |
| 6,421,675 B1 | 7/2002 | Ryan et al. |
| 6,684,369 B1 | 1/2004 | Bernardo et al. |
| 6,829,780 B2 | 12/2004 | Kraft et al. |
| 6,907,566 B1 | 6/2005 | McElfresh et al. |
| 6,980,205 B1 | 12/2005 | Zettsu et al. |
| 6,985,882 B1 | 1/2006 | Del Sesto |
| 7,039,599 B2 | 5/2006 | Merriman et al. |
| 7,136,875 B2 | 11/2006 | Anderson et al. |
| 7,213,202 B1 | 5/2007 | Kagle |
| 7,363,302 B2* | 4/2008 | Lester ............ 725/42 |
| 7,574,651 B2* | 8/2009 | Ebrahimi et al. ............ 715/243 |
| 7,639,898 B1 | 12/2009 | Chan |
| 7,697,791 B1 | 4/2010 | Chan et al. |
| 7,725,502 B1 | 5/2010 | Badros et al. |
| 7,779,352 B1* | 8/2010 | Underwood et al. ......... 715/250 |
| 7,801,738 B2 | 9/2010 | Agarwal et al. |
| 7,996,753 B1 | 8/2011 | Chan et al. |
| 8,065,611 B1 | 11/2011 | Chan et al. |
| 8,595,071 B2* | 11/2013 | Veach ............ 705/14.73 |
| 2001/0042064 A1 | 11/2001 | Davis et al. |
| 2001/0047297 A1 | 11/2001 | Wen |
| 2001/0051911 A1 | 12/2001 | Marks et al. |
| 2002/0002509 A1 | 1/2002 | Wagorn et al. |
| 2002/0002525 A1 | 1/2002 | Arai et al. |
| 2002/0026359 A1 | 2/2002 | Long et al. |
| 2002/0035536 A1 | 3/2002 | Gellman |
| 2002/0038282 A1 | 3/2002 | Montgomery |
| 2002/0046099 A1 | 4/2002 | Frengut et al. |
| 2002/0046104 A1 | 4/2002 | Kaddeche et al. |
| 2002/0077891 A1 | 6/2002 | Castle et al. |
| 2002/0099605 A1 | 7/2002 | Weitzman et al. |
| 2002/0111898 A1 | 8/2002 | Numaoka et al. |
| 2002/0122060 A1 | 9/2002 | Markel |
| 2002/0123988 A1 | 9/2002 | Dean et al. |
| 2002/0165773 A1 | 11/2002 | Natsuno et al. |
| 2002/0184097 A1 | 12/2002 | Hijiri et al. |
| 2002/0194062 A1 | 12/2002 | Linde |
| 2002/0198780 A1 | 12/2002 | Kawakami et al. |
| 2003/0037334 A1 | 2/2003 | Khoo et al. |
| 2003/0046161 A1 | 3/2003 | Kamangar et al. |
| 2003/0055729 A1 | 3/2003 | Bezos et al. |
| 2003/0070167 A1 | 4/2003 | Holtz et al. |
| 2003/0083937 A1 | 5/2003 | Hasegawa et al. |
| 2003/0149618 A1 | 8/2003 | Sender et al. |
| 2003/0163372 A1 | 8/2003 | Kolsy |
| 2003/0216963 A1 | 11/2003 | Ishiwaka et al. |
| 2004/0015397 A1 | 1/2004 | Barry et al. |
| 2004/0019523 A1 | 1/2004 | Barry et al. |
| 2004/0044571 A1 | 3/2004 | Bronnimann et al. |
| 2004/0054577 A1 | 3/2004 | Inoue et al. |
| 2004/0054589 A1 | 3/2004 | Nicholas et al. |
| 2004/0059708 A1 | 3/2004 | Dean et al. |
| 2004/0059712 A1 | 3/2004 | Dean et al. |
| 2004/0093327 A1 | 5/2004 | Anderson et al. |
| 2004/0093620 A1 | 5/2004 | Iino et al. |
| 2004/0119740 A1 | 6/2004 | Chang et al. |
| 2004/0123244 A1 | 6/2004 | Campbell et al. |
| 2004/0143499 A1 | 7/2004 | Dietsch et al. |
| 2004/0143843 A1 | 7/2004 | Khoo et al. |
| 2004/0167928 A1 | 8/2004 | Anderson et al. |
| 2004/0205575 A1* | 10/2004 | Wattenberg ............ 715/513 |
| 2004/0243470 A1* | 12/2004 | Ozer et al. ............ 705/14 |
| 2004/0249709 A1 | 12/2004 | Donovan et al. |
| 2004/0260767 A1 | 12/2004 | Kedem et al. |
| 2004/0267806 A1* | 12/2004 | Lester ............ 707/103 R |
| 2005/0055635 A1* | 3/2005 | Bargeron ............ G06F 17/248 715/251 |
| 2005/0065806 A1 | 3/2005 | Harik |
| 2005/0071224 A1 | 3/2005 | Fikes et al. |
| 2005/0096979 A1 | 5/2005 | Koningstein |
| 2005/0097204 A1 | 5/2005 | Horowitz et al. |
| 2005/0131758 A1 | 6/2005 | Desikan et al. |
| 2005/0144069 A1 | 6/2005 | Wiseman et al. |
| 2005/0216547 A1* | 9/2005 | Foltz-Smith et al. ........ 709/200 |
| 2005/0222900 A1 | 10/2005 | Fuloria et al. |
| 2005/0222903 A1 | 10/2005 | Buchheit et al. |
| 2005/0222989 A1 | 10/2005 | Haveliwala et al. |
| 2005/0223002 A1 | 10/2005 | Agarwal et al. |
| 2005/0240580 A1 | 10/2005 | Zamir et al. |
| 2005/0251443 A1 | 11/2005 | Chan et al. |
| 2007/0027744 A1* | 2/2007 | Carson et al. ............ 705/10 |

FOREIGN PATENT DOCUMENTS

| | | |
|---|---|---|
| WO | WO0038074 A1 | 6/2000 |
| WO | WO0219153 A1 | 3/2002 |
| WO | 2004/070579 A2 | 8/2004 |
| WO | WO2004070579 A2 | 8/2004 |
| WO | 2004/0260767 A1 | 12/2004 |
| WO | 2005006141 | 1/2005 |
| WO | WO2004042525 A3 | 4/2005 |
| WO | WO2010026610 A1 | 3/2010 |

OTHER PUBLICATIONS

Rowse, D.,"Positioning Your Adsense Ads," in ProBlogger, © Mar. 2, 2005, downloaded from <"http://www.problogger.net/archives/2005/03/02/positioning-your-adsense-ads">, 5 pages.*

Doyle, K. et al.,"Banner Ad Placement Study," archived Feb. 3, 2003, downloaded from <"http://www.webreference.com/dev/banners/index.html">, 28 pages.*

AdForce, Inc., A Complete Guide to AdForce, Version 2.6, 1998, 285 pages.

AdForce, Inc., S-1/A Sec Filing, May 6, 1999, 9 pages.

AdKnowledge Campaign Manager: Reviewer's Guide, AdKnowledge, Aug. 1998, 23 pages.

AdKnowledge Market Match Planner: Reviewer's Guide, AdKnowledge, May 1998, 26 pages.

Ad-Star.com website archive from www. Archive.org, Apr. 12, 1997 and Feb 1, 1997, 43 pages.

Baseview Products, Inc., AdManagerPro Administration Manual v. 2.0, Dec. 1998, 226 pages.

Baseview Products, Inc., ClassManagerPro Administration Manual v. 1.0.5, Feb. 1, 1997, 157 pages.

Business Wire, "Global Network, Inc. Enters Into Agreement in Principle With Major Advertising Agency," Oct. 4, 1999, 2 pages.

Information Access Technologies, Inc., Aaddzz brochure, "The Best Way to Buy and Sell Web Advertising Space," © 1997, 42 pages.

Zeff, R. et al., Advertising on the Internet, 2nd Ed., John Wiley & Sons, 1999, 440 pages.

Dedrick, R., Interactive Electronic Advertising, IEEE, 1994, 12 pages.

Dedrick, R., A Consumption Model for Targeted Electronic Advertising, Intel Architecture Labs, IEEE, 1995, 9 pages.

Request for Reexamination of U.S. Pat. No. 7,240,025 B2, Control No. 95/001,073.

Request for Reexamination of U.S. Pat. No. 6,446,045 B1, Control No. 95/001,061.

(56) References Cited

OTHER PUBLICATIONS

Request for Reexamination of U.S. Pat. No. 7,249,059 B2, Control No. 95/001,069.
Request for Reexamination of U.S. Pat. No. 6,829,587 B2, Control No. 95/001,068.
Google Introduces New Pricing for Popular Self-Service Online Advertising Program, http://www.google.com/press/pressrel/select.html, p. 1-2, dated Feb. 20, 2002, printed on Jul. 29, 2003.
Information Access Technologies, Inc., Aaddzz.com website archive from www. Archive.org, archived on Jan. 30, 1998, 42 pages.
Collection of pages from www.overture.com, printed on Jul. 29, 2003, 4 pages.
Collection of pages from findwhat.com, http://www.findwhat.com, printed on Jul. 29, 2003, 52 pages.
Collection of pages from Sprinks.com, http://www.sprinks.com, printed on Jul. 29, 2003, 11 pages.
Collection of pages from Kandoodle.com, http:www.kanoodle.com, printed on Jul. 29, 2003, 5 pages.
Collection of pages from Google Advertising, http://www.google.com, printed on Jul. 29, 2003, 80 pages.
Chris Sherman, "Google Launches AdWords Select," Feb. 20, 2002, 6 pages.
Communication for Application No. EP 06838513.7, dated Dec. 23, 2009, 7 pages.
Reexamination of U.S. Appl. No. 95/001,073, filed Sep. 30, 2004, Stone et al.
Reexamination of U.S. Appl. No. 95/001,061, filed Sep. 3, 2002, Stone et al.
Reexamination of U.S. Appl. No. 95/001,069, filed Jul. 11, 2002, Dean et al.
AdForce, Inc., A Complete Guide to AdForce, Version 2.6, 1998, Chapter 7, 285 pages.
Ad-Star.com website archive from www. Archive.org, Apr. 12, 1997 and Feb. 1, 1997, 43 pages.
Information Access Technologies, Inc., Aaddzz brochure, "The Best Way to Buy and Sell Web Advertising Space," © 1997, 6 pages.
Request for Reexamination of U.S. Pat. No. 6,446,045 Bl, Control No. 95/001,061.
Office Action for Application No. 2,631,548 dated Dec. 10, 2012, 3 pages.
Communication pursuant to Article 94(3) EPC for Application No. EP 06838513.7, dated Aug. 20, 2012, 8 pages.
Authorized officer Reid Mulligan, Examiner's Report in CA Patent Application No. 2,631,548 mailed Nov. 22, 2013, 3 pages.
Office Action for Application No. 2,631,548 dated Dec. 9, 2014, 3 pages.
Office Action in Indian Application No. 1357/MUMNP/2008, mailed Jul. 3, 2014, 3 pages.

* cited by examiner

FORMATTING A USER NETWORK SITE BASED ON USER PREFERENCES AND FORMAT PERFORMANCE DATA

CROSS-REFENRECE TO RELATED APPLICATIONS

This application is a continuation of and claims priority to U.S. application Ser. No. 11/288,431, filed on Nov. 29, 2005, now U.S. Pat. No. 7,603,619, entitled, "Formatting a User Network Site Based on User Preferences and Format Performance Data", which is incorporated herein by reference.

FIELD OF THE INVENTION

The present inventions relate to automatically determining and/or suggesting a format for an electronic document, e.g., based on user preference information and format performance information.

BACKGROUND OF THE INVENTION

Like newspaper publishers and other content providers, many website owners display advertisements on their websites to earn revenue. For instance, a website publisher or owner may earn a small fee each time a user selects an ad on its webpage. Various factors can influence the extent to which users select an advertisement on a webpage, such as the color, size, and layout of the ads, e.g., with respect to other content on the webpage. Another important factor is the relevance of the ad to the website's target audience. To increase avenue, it is in the interest of website owners to configure the ads on the webpage in a manner that makes them more likely to be seen and selected by users. Content publishers also have an interest in limiting the extent to which the ad or ads may interfere with the primary content on the webpage.

Many services that enables users to configure pages such as blogs do not offer ad customization at all. A single ad format is often used for every user page. Other services enable users to request ads on their page, but the user must manually customize its format, e.g., via software such as TypePad™. Thus, the conventional process by which a website administrator places ads on a webpage is often highly manual in nature.

This is especially true for user blogs, which are typically created and administered by users who lack knowledge of or access to sophisticated webpage formatting tools. According to a conventional method, users manually select a format and color scheme for their blog. Users then edit the webpage template to include code related to the ad block. Users typically make poor decisions about colors and ad placement. For example, users often select default color schemes, even though default color schemes for ad blocks and user blogs typically do not work well together. Regardless, user formatting decisions typically do not reflect the accumulated marketing wisdom of institutional advertisers who are positioned to receive data regarding the effectiveness of ads of a given format on a given webpage format.

These and other drawbacks exist with current systems and methods.

SUMMARY OF THE INVENTION

Accordingly, various embodiments of the present inventions may be directed to a system and a method for formatting an electronic document. Format preference information related to the format of a user network site associated with a user is received. Document format criteria based on the format preference information may be automatically determined. An electronic document associated with the user network site is output according to the document format criteria.

According to another exemplary embodiment, a system for formatting an electronic document is provided. An input device receives format preference information related to the format of a user network site associated with a user. A format determination processor automatically determines document format criteria based on the format preference information. A server causes an electronic document associated with the user network site to be output according to the document format criteria.

According to another exemplary embodiment, a method for formatting an electronic document may determine format performance information related to the format of a user network site associated with a user is received. Document format criteria based on the format performance information may be automatically determined. An electronic document associated with the user network site is output according to the document format criteria.

According to another exemplary embodiment, a system for formatting an electronic document is provided. A determination device determines format performance information related to the format of a user network site associated with a user. A format determination processor automatically determines document format criteria based on the format performance information. A server causes an electronic document associated with the user network site to be output according to the document format criteria.

According to another exemplary embodiment, a method for formatting an electronic document is provided. Format preference information related to the format of a website is received from a user during setup of the website. The format preference information comprises information about the size, layout, shape, color, or timing of display of at least one object to be output via the website. Advertisement format criteria is automatically determined for the website based on the format preference information and format performance information. The format performance information comprises information about the performance of a plurality of advertisements having a plurality of different formats. A request for content associated with the website is received from an entity. One or more advertisements are selected based on a relevance to a concept associated with the website and a rank based on a bid. The one or more advertisements are caused to be output via the website according to the advertisement format criteria.

Other embodiments may be considered.

DETAILED DESCRIPTION OF EXEMPLARY EMBODIMENT(S)

It is an object of some embodiments of the invention to make it easier for users to format a network site, e.g., to set up advertisements on a personal webpage such as a blog. Using software to guide a user through a network site setup process can eliminate steps that would otherwise be accomplished manually by the user. For example, the code that governs the importing of ads from an ad provider into a network site can be automatically created and/or imported into the network site code. Automatic setup may eliminate the need for a user to set up this code manually.

It is a further object of some embodiments of the invention to format network sites such as web logs (blogs) and other electronic documents so that advertisements are more effective. Increasing the likelihood that a viewer selects an ad will increase the number, of times viewers select the ad and bring revenue to the network site owner, ad broker, and/or other parties. Improving ad performance also increases the number of potential customers for the advertiser and can thereby improve the advertiser's business.

Accordingly, various embodiments of the invention are directed to systems and methods for automatically creating a network site template. A software wizard may guide a user through a network site setup process wherein the wizard prompts the user for various preferences and other inputs related to the network site. Based on these inputs, the software wizard may automatically determine formatting information such as color (e.g., a color palette), size, placement, and other formatting criteria for advertisements or other objects. The software wizard may determine the formatting information to maximize the effectiveness of the user network site under various criteria, such as ad performance. For instance, the software wizard may configure the color, size, and placement of ads in a manner that will maximize viewer selections of the advertisement, click through rate, ad revenue, or other performance metrics. In order to achieve this result, formatting may be determined based on performance data, such as data regarding the click through rate of prior ads of various formats.

According to one embodiment, a user may initiate a software wizard to set up a network site. For instance, a user of the Blogger™ service may initiate an auto-setup of a user blog site. During setup, the wizard may guide the user through various prompts and inputs, and various webpage configurations and options may be presented to the user. For instance, one setup page having a preview panel and may enable the user to select various format controls and preview the network site as it would appear according to the currently selected formatting parameters. For example, the preview panel may show the user's blog with JavaScript injected into the blog page to show how it would look with ads in it. (Sample or dummy ads may be used for setup and formatting purposes.) The JavaScript may examine the style characteristics of the page dynamically and select the best-fitting format, generate a matching color scheme for the ad(s), and select an advantageous location for placement of the ad(s). The user can then change these settings (if desired) and accept the ad block.

Website-based advertisements may be presented to their advertising audience in the form of "banner ads"—i.e., a rectangular box across the top of a webpage that includes a graphic. The graphic may be animated to attract the audience's attention. When a member of the advertising audience selects an ad by clicking on it, one or more embedded hypertext links typically direct the viewer to the advertiser's website. This process, wherein the viewer selects an advertisement, is commonly referred to as a "click through," and may be used to refer to any type of user selection. The ratio of the number of click throughs to the number of impressions of a particular advertisement (i.e., the number times an advertisement is displayed) is commonly referred to as the click through rate, of the advertisement. It is an object of the invention to increase the "page click through rate," or the rate at which users select an advertisement on a page. Various embodiments of the invention may achieve this goal by formatting ads in a way that tends to increase the click through rate (CTR).

After the network Site is formatted, it may be published to other users. When other users access the network site, the resulting webpage may display content such as ads and other electronic documents in accordance with the determined format. The ads or other documents may be selected for display based on various criteria described or referenced herein. For instance, ads may be selected for output based on a relevance, e.g., a relevance to a concept on the published webpage. For instance, if a user blog page discusses shoes, several ads for shoes may be displayed on the page. The documents may be displayed based on a rank. For example, the documents may be ranked based on relevancy, performance parameter (e.g., click through rate (CTR), conversion rate, performance information, other measure of performance, etc.), price parameter (e.g., an amount an advertiser is willing to pay for each click, bid amount, price information, other measure of price, etc.), and/or other factors.

While ads and websites are discussed herein for exemplary purposes, it should be understood that various embodiments of the invention may be directed to other electronic documents. For instance, various embodiments of the invention may be used for documents such as content pages, search results, emails, applications, IM messages, audio content or files, video content or files (e.g., television programming), Flash objects and files, animated GIF files or other image files, other files, other data or applications that may reside on one or several (e.g., a network) of computer systems, or other definable concepts or content. For instance, audio ad content (or other document comprising audio) may be formatted with an audio format that is determined to have an advantageous feature. For instance, elements of an audio message such as a human voice (or voices), music, and other sounds or sound effects may be formatted according to rhythm, timing, time duration, timbre, and tone to make the message more effective.

While the term "advertisement" and "ad" may be used as an illustrative example herein, it should be appreciated that the systems and methods described herein may be applied to other forms of documents or electronic documents. As used herein, the term "document" and "electronic document" may encompass one or more advertisements, content pages (e.g., webpages), search results, emails, applications, IM messages, audio content or files, video content or files, other files, other data or applications that may reside on one or several (e.g., a network) of computer systems, or other definable concepts or content. A "document" may also comprise a portion of a document.

It should be understood that the actions described in this application (e.g., the actions that may be accomplished via a server) that do not expressly require human intervention may be performed automatically, i.e., by any machine-executable process and/or a process that does not require human intervention or input.

Overview and System Architecture

Figure 1:
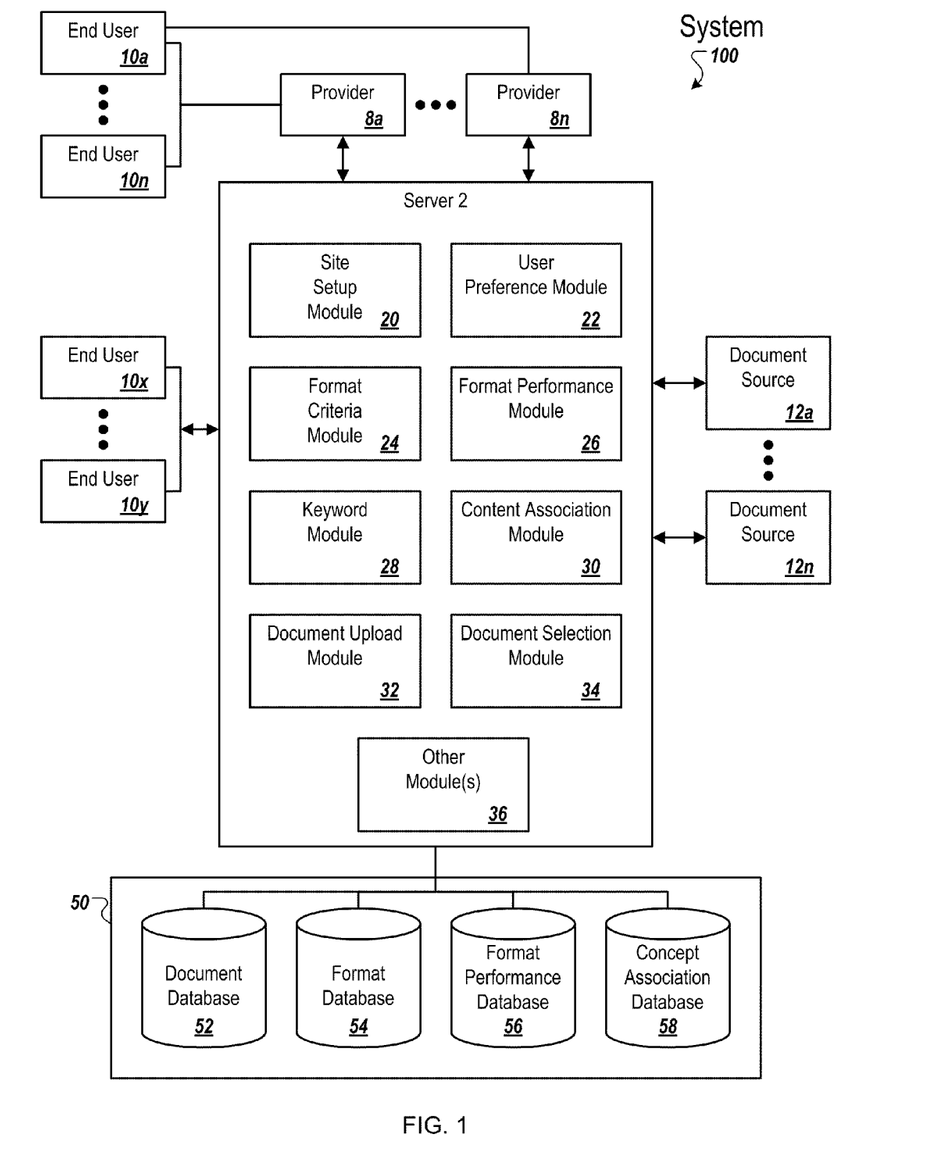
FIG. 1 depicts a system for targeting an electronic document according to an embodiment of the invention.

FIG. 1 depicts a system 100 for formatting an electronic document based on criteria. System 100 may comprise one or more servers 2 operatively connected to one or more providers 8, end users 10, and document sources 12. Providers 8 may provide content such as advertisements to server 2. A user 10a may communicate with server 2 in order to set up and format a user network site. Other entities such as users 10*a-n* who access the user network site may receive a webpage or other user network site information formatted according to formatting criteria determined at least in part by server 2. For example, advertisements from providers 8 may be displayed on the page in accordance with size, location, color, and timing parameters determined by the server 2 and/or user 10.

Information that may be processed and/or communicated between and among server 2, providers 8, document sources 12, and end users 10 may include, for example, one or more of the following: user preference information, format information, format performance information, document information, document content information, content identification information, concept association information, document-concept association information, document and/or format performance information, concept/keyword price information, performance information, and other information. The document information may include one or more of the following: the document itself, audio-visual content (e.g., pictures of faces, song lyrics, etc.), identification of audio and/or visual content, concepts associated with the document or portions thereof, any language(s) used in the document, length information, information regarding the type(s) of files in the document (e.g., html, doc, zip, etc.), type of document (advertisement, educational document), summary information, pornographic content, other offensiveness content (e.g., use of potentially offensive words), the identity of the document owner and/or the document creator, information about the document's intended audience (such as geographic area, age range, gender, race, national origin, religion, other demographic information), and any other information related to a document or to the server 2, providers 8, or document sources 12.

The server 2 may comprise any server, network account provider (e.g., email account provider), hub, central processor, provider, search engine, electronic billboard system, or other entity in a network. Although a single server 2 is depicted, it should be appreciated that multiple servers 2 may be provided and that such multiple servers may share data and operational tasks to achieve efficiency and operation of the functions described herein. The server 2 may also comprise a content provider system. The server 2 may comprise input and output devices for communicating with other various system 100 elements.

Providers 8 may operate separately or in combination with server 2. Providers 8 may provide content pages, search results and/or other types of pages to one or more end-users 10. Content provider 8 may comprise any server, document provider (e.g., a website publisher or other content provider), search engine, or other entity that publishes or makes available information, services, and/or products over an electronic network, such as the Internet Content provider 8 may comprise one or more of the following, for example: an advertisement listings provider, an electronic document publisher or provider, a website host, a server 2, any other entity that provides electronic documents to users or other entities, or any other provider of content. Additional participants may be included based on various applications. For example, multiple advertisers, providers and end-users as well as multiple servers, modules and databases may be implemented.

End users 10*a*-10*n* may comprise persons who may receive documents or other content, by receiving a webpage at a user computer. The term end user 10 may also refer to the user's display, computer, or web browser 10, such as Internet Explorer™, which may communicate with providers 8 and server 2.

Document sources 12 may comprise any entity that may submit a document to the server 2 (or provide instructions to create a document). Document sources 12 may comprise any server, web browser, document publisher, or other entity that may request documents, e.g., from server 2.

Document sources 12 such as advertisers may communicate with server 2 via electronic communication, including Internet communications. Providers 8 may include server 2 for providing functionality associated with formatting documents for display.

Server 2 may comprise a plurality of modules, including, for example, site setup module 20, user preference module 22, format criteria module 24, format preference module 26, keyword module 28, content association module 30, document upload module 32, document selection module 34, and other module(s) 36. Each module may comprise a server 2 and/or another computer-based system.

Site setup module 20 may enable a user 10 or other entity to set up and/or format a network site. For instance, site setup module 20 may comprise software, such as a software setup wizard that may guide a user through a setup and/or formatting process. The site setup module 20 may prompt for user selections or otherwise request the user to specify various preferences associated with the network site, such as layout, size, content, color, font, etc.

For example, during setup, input fields may enable a user to input/select a headline for the network site, network site description line(s), and other objects. During setup the user may select, for example, resolution and/or layout settings for a document such as a webpage and/or objects in the webpage, such as advertisements. For instance, the user may select a 468×60 banner ad, 120×600 skyscraper ad, 728×80 leaderboard ad, and 300×250 inline ad. A keyword input may enable the user to provide keywords that may be associated with the ad by the server 2. Selecting a keyword suggestion tool input may direct the user to one or more keyword suggestion tool documents, and/or it may cause the server 2 to provide one or more suggested keywords. The server 2 may generate or select suggested keywords based on the information received from the user, such as the purchaser's ad heading, description, URL, etc.

The setup wizard may provide the user with a color palette for selecting colors to be used in the website, such as the background or foreground of the website as well as text color. The headline, description, and display URL components of the document may be customized together or separately.

User preference module 22 may enable users to specify preferences about the setup of a network site, such as the format of the network site (e.g., webpage). Preferences that may be specified may relate to any of the following, for example: size of document or object in document (such as an advertisement, article, blog entry, heading, etc.); layout of the document (such as number of columns, rows, relative size of different objects, distance and orientation between different objects); color of one or more objects in the document (including the background color, text color, color scheme, etc.); the time at which a document (such as an advertisement) may be displayed; the document location (e.g., on a webpage); the length of time the document will be displayed; the type or identity of other documents (or associated document sources 12) that may be displayed with the document or otherwise displayed on the same page as the document (e.g., a toy manufacturer's advertisement, a specific movie trailer, a text ad, a graphic ad, an ad containing video or sound, the presence of motion in a document, whether the document is a solicitation); the manner of switching between documents (e.g., fading to and from black or white before and after each document is displayed); resolution of display; and other features or characteristics such as those described or referenced elsewhere herein. For example, a user may specify a size (e.g., in number of pixels, inches, or other metric) for a text block or advertisement block.

User preference module 22 may comprise a setup wizard that prompts for user selections or other user preferences, e.g., regarding the content, formatting, and/or other features related to a user network site. For instance, using a setup wizard the user preference module 22 may provide a plurality of possible format selections, such as pictures of a variety of formats or a variety of formatting choices (e.g., relating to the size or shape of an ad or other document object). The setup wizard may then receive user selections and pass them to the format criteria module 24 or other modules.

User preference module 22 may also provide a sequence of choices, wherein each subsequent set of choices reflect the user's prior expressed preferences. For instance, if a user selects a three-column format, user preference module may subsequently provide a plurality of possible formats for a title within a three-column format. The possible title formats may reflect CTR (or other performance) data.

Format criteria module 24 may determine format criteria associated with one or more documents, a website comprising one or more ads. In some embodiments, format criteria module 24 may determine the size, layout, color, and other formatting features of a document such as a webpage. For instance, in conjunction with site setup module 20, format module 24 may determine format criteria (such as a document template) that governs the display of a document such as a website. The format criteria module 24 may suggest possible formats based on user preferences (e.g., format selections made by the user) as well as format performance criteria. In this way, format criteria module 24 may determine a format that governs the display of ads or other documents in a desirable manner, e.g., a manner that maximizes the click through rate of the ads.

Format criteria module 24 may determine the positions of various documents within a composite document. For instance, multiple advertisements may be displayed in multiple banners (or a single time-multiplexed banner), across the top of a page (e.g., search page, content page, etc.), along the side of search results, and anywhere else on the page.

Format criteria module 24 may determine format criteria based on user preferences, format performance information, and any other criteria described herein.

Format criteria module 24 may also scale a document such as an ad to fit a predetermined size or shape (e.g., fill a rectangle of uniform size with the document). Ads may be scaled to different sizes. For example, certain ads may be sized or shaped differently based on an advertiser's willingness to pay an additional amount (or other incentive or credit). Also, for different display environments, the document may be sized based on the available space. For example, for a content page, the document may be intended for placement on a different size or shape than a search result page. Other environments and criteria for sizes, shapes and other formats for display may be considered.

Format performance module 26 may determine the performance information associated with one or more formats or format types. For example, format performance module 26 may compare the performance of a specific ad (or group of ads or ad type) in a given format or plurality of formats. For instance, the module 26 may compare the click through rate (or other metric) between a particular ad when it was displayed at the top left of a page having a specific two-column format versus the click through rate of the same ad (or a different ad) in the bottom right of a page having a similar two-column format. Based on the comparison, the module 26 may determine that displaying the top left position yielded a higher CTR for the two-column page format. The results may be reversed when similar data is compared for a page having a three-column format and a blue background. Data and results may be controlled for any kind of format variable to determine the effect of any given variable on a document's performance, either in isolation or in the context of a given set of predetermined format variables. In this way, format performance module 26 may be used to determine one or more optimal formats given a set of user preferences regarding format, such as a user color scheme preference.

For example, format performance module 26 may determine that primary colored-ads perform best when the foreground and background of the webpage also have primary colors.

It should be appreciated that format performance module 26 may also use other formatting data. For instance, fashion data about what colors and color schemes match well together may be used to determine what color ads blend well with a particular colored webpage. It should also be appreciated that "performance" is not limited to economic considerations. An optimal performance may be an optimal balance of a desirable click-through rate and an unobtrusive, small ad. In such a case, the "optimal" size of the ad may be small even if that lowers its click through rate.

It should be appreciated that format performance may be based on any factor, including the content of the site. For instance, ads on the left side of a page may be more successful for child-oriented sites.

Keyword module 28 may enable a user 10 associated with a network site to specify keywords associated with the site. For example, a user 10 who administers a website that lists current bargains at major retailers may specify the keyword "deal" and/or "bargain". The keywords may be used by the server to select ads and/or other documents or content that is related to the website.

Content association module 30 may also associate concepts with a network site and/or document. For example, content association module 30 may automatically associate keywords with the site based on the content on the site. If the site contains the words "television" and "plasma" and "projector", then module 30 may associate the site with the keywords "display device" and "TV". Documents such as advertisements may be selected for display at the site based on the keywords. For example, advertisements for high-definition televisions may be displayed on a site associated with the word "TV".

Content association module 30 may also enable a document source 12 (such as an advertiser) to identify one or more content-based concepts (e.g., keywords, subject matter, etc.) for association with a document, e.g., an ad provided by or associated with an advertiser.

Document upload module 32 may enable a document source 12 (e.g., an advertiser) and/or user 10 to upload or otherwise transfer a document to server 2. The document may be uploaded by identifying an address (e.g., URL address, etc.). In this way, advertisers and users may upload ads and websites to the server 2.

Document selection module 34 may select one or more documents. For instance, document selection module 30 may select one or more documents related to one or more concepts, such as keywords provided by a user associated with the network site, and/or content identified on the site. Various criteria may be used in selecting ads or other documents for display on a user network site, such as preferences, relevance, performance criteria, and environmental information, as discussed in the applications incorporated herein.

Other module(s) 36 may have other functions.

The modules of server 2 may store, access and otherwise interact with various sources of data, including external data, databases and other inputs.

The server 2 and server modules may communicate with a plurality of databases, which may also function collectively or separately. Databases may include document database 52, format database 54, format performance database 56, and concept association database 58.

A document database 52 may store documents such as an advertisements or other documents that may be provided to content providers 8, users 10, and document requestors 12. For instance, a user 10 may click on a hypertext link on a webpage that causes the user's web browser to request a document from the server 2. The server 2 may then provide the document to the user 10.

A format database 54 may store format information related to one or more documents, such as user network sites. For example, format database may store default formats that may be suggested to users during creation of a network site. Format database 54 may also store format information determined during a site setup and/or format process.

A format performance database 56 may store performance and comparison information related to one or more format criteria. The format performance and comparison information may be determined based on the performance of one or more documents having a specific format. For instance, format performance database 56 may store information about the CTR of a document when it was located at the bottom of a webpage versus the performance of the same (or similar) document when it was displayed at the top of a webpage, Performance information related to any format criteria may be stored herein, for example, color, placement, size, contextual factors (such as the document's proximity to another object such as text and the size, placement, and format of that other object), etc. For example, format performance information may include information about how a document having a primary color scheme in a double-column webpage is likely to perform in comparison to the same or similar document having a pastel color scheme in a single-column format. Any criteria may be considered and evaluated.

Format performance information may be determined based on document performance information. Document performance information may comprise, for example, click through rate (CTR), cost per click (CPC), revenue information, and other information. Document performance data may also comprise how often a document is selected from a plurality of documents associated with a concept.

Concept association database 58 may store keywords and other concepts associated with documents. For instance, in order to select a document associated with a specific concept such as a keyword, the document selection module may access the concept database 58 to match the specific concept with one or more concepts in the database. In this way, a document can be selected that is related to the specific concept.

It should be understood that the server, processors, modules, and databases described herein may perform their various functions (e.g., determining formatting criteria) documents) automatically or via an automated system. As used herein, the term "automatically" refers to an action being performed by any machine-executable process, e.g., a process that does not require human intervention or input. As used herein, the term "concept" and "idea" may refer to a concept, image, word, document, sound, location, content, or other idea, or any combination thereof.

It should be further understood that the server 2 may comprise other modules, features; and functions, e.g., as described in other applications referenced here in. For example, features of the server 2 and other system 100 elements and methods are also disclosed in U.S. patent application Ser. No. 10/742,791 , now U.S Application Publication No. 2005/0144069A1 ,entitled "Method And System For Providing Targeted Graphical Advertisements" filed Dec. 23, 2003 , U.S. patent application entitled "System and Method for Rating Electronic Documents" filed Mar. 30, 2004 , now U.S. Pat. No. 7,533,090, U.S. patent application entitled "Automated Graphical Advertisement Size Compatibility and Link Insertion" filed May 10, 2004 , now U.S. Patent Application Publication No. 2005/0251443 A1 , U.S. patent application entitled "System and Method for Rating Documents Comprising an Image" filed May 10, 2004, now U.S. Pat. No. 7, 801,738 B2, U.S. patent application entitled "Method and System for Providing Targeted Documents Based on Concepts Identified Therein" filed May 10, 2004 , now U.S. Pat No. 7,697, 791 B 1 , U.S. patent application Ser. No. 10/880,322 entitled "Method and System for Automatically. Creating an Image Advertisement" filed Jun. 30, 2004 , now U.S. Pat No. 7, 996, 753 B1, U.S. patent application entitled "Method And System For Approving Documents Based On Image Similarity" filed May 10, 2004 , now U.S. Pat No. 7, 639,898 B 1, the U.S. patent application entitled "Method And System For Mining Image Searches To Associate Images With Concepts" filed and U.S. patent application Ser. No. 11/152,781 entitled "Time-Multiplexing Documents Based on Preferences or Relatedness" filed Jun. 15, 2005, now U.S. Pat No. 7, 725,505. These application are incorporatated herein by reference in their entirety. The disclosures of these applications should not be interpreted to limit any of the features describe herein.

Illustrative System Environment

Figure 2:
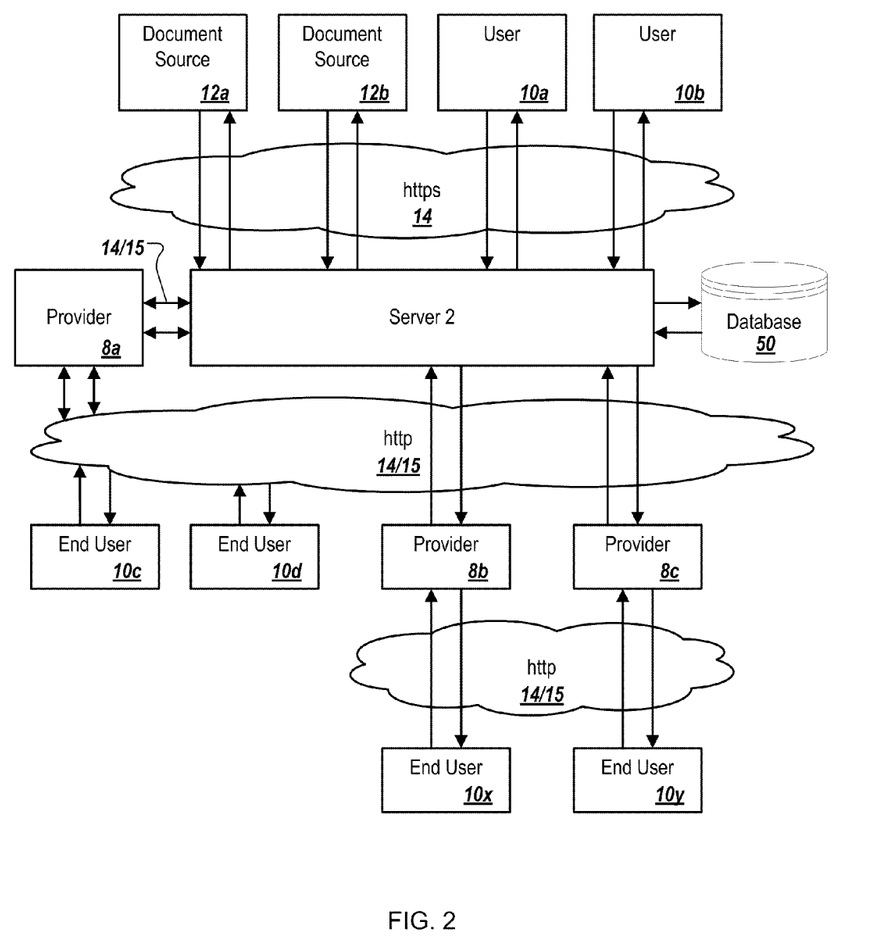
FIG. 2 depicts a networked environment for operation of a system for targeting an electronic document according to an embodiment of the invention.

FIG. 2 depicts a networked environment for operation of a system for providing a legitimacy rating according to an embodiment of the invention. In such an environment, content sources 12 and providers 8 may connect over a network 14, 15 to a server 2 (e.g., using a secure https connection) to provide documents and other information to server 2. The server 2 may store the document and other information in a database 50. The server 2 may distribute the documents through various forums or feeds to provide the documents on one or more network sites affiliated with the server 2 and through providers 8. It should be noted that providers may comprise syndication partners of the server 2 (e.g., connected over network 14 or 15 depending on security desired), content systems (e.g., with associated content databases) and search engine systems operated by the server 2 or provider(s) 8.

Through these various forums, the documents provided to the providers 8 may be included in pages (or other documents) displayed to end-users 10 (often called an impression).

Each of server 2, providers 8, and content sources 12 may comprise computerized systems that include one or more of the following systems, for example: a web server 2, a database server 2, proxy server 2, network balancing mechanisms and systems, and various software components that enable the system to operate on the Internet or other network type system. Additionally, networks 14 and 15, although depicted as http networks may comprise other networks such as private lines, intranets, or any other network. In an exemplary embodiment, the connection between a content source 12 such as an advertisement provider and server 2 (and other connections such as between a provider 8 and server 2) may comprise secure network connections to insure that data is not subject to attack or corruption by any hacker or other third party. In addition, whereas two content sources 12 are depicted, it should be appreciated that one or more content sources 12 may be provided in the network. Similarly, although one database 50 is depicted, it should be appreciated that multiple database 50 may be provided and that such database 50 may be connected to the server 2 via any type of network connection, including a distributed database server 2 architecture.

Similarly, provider 8a may comprise any number of such systems connected to the server 2 via any type of network, including an http or https network. Provider 8 may comprise a system such as server 2 that provides functionality for enabling connection over the Internet or other network protocols. Providers 8 may comprise any system that distributes content such as advertising to end-users 10.

End users 10 may comprise any user (such as users connected to the Internet) and may comprise computerized systems that enable that connection through any of various types of networks, including through Internet service providers, cable companies, and any other method of accessing data on the Internet.

Further information about system 100 environments may be found in the U.S. applications incorporated herein, above.

Illustrative Document Format Process

Figure 3:
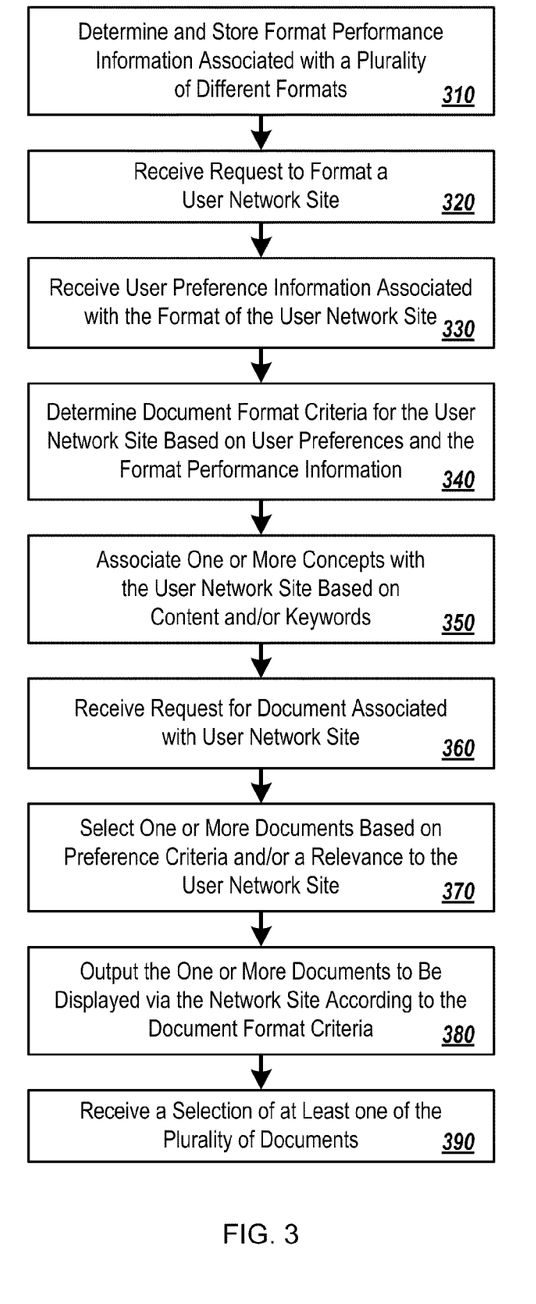
FIG. 3 shows a flow chart illustrating an exemplary method for formatting a document according to an embodiment of the invention.

FIG. 3 shows a flow chart illustrating an exemplary method for formatting a document according to an embodiment of the invention.

In block 310, format performance information associated with a plurality of different formats may be collected, processed, determined, and stored. For instance, format performance module 22 may determine the click through rate or other performance information of ads displayed on websites according to a particular format such as a particular location on a page. For instance, format performance module 22 may determine that an ad is more likely to be selected when it appears at the top of the page than when it is on the bottom, and it may further determine that ads are more effective if they "match" the color scheme of the webpage in which they appear.

Format performance information for a particular format may change over time, e.g., as more data is collected. For instance, banner ads may be favored one year, while text ads and time-multiplexed ads may be more popular another year. Thus, format performance information may be continually updated. Format criteria based on the format performance information may be similarly revised based on the new format performance information.

In block 320, a request to create and/or format a network site is received, e.g., by server 2 from a user 10. For instance, a user may request to create a personal blog webpage.

In block 330, user preference information associated with the format of the user network site may be received, e.g., by server 2 from a user 10. For instance, a software setup wizard may guide the user through a setup process for the network site such as a blog. The user may select a color scheme, layout, and other format features. The user may accordingly provide format and other preference information. The setup wizard may dynamically change the formatting and appearance of the network site based on each user preference. For example, if a user selects an green color scheme, a preview pane may show a sample webpage having a green color scheme.

It should be appreciated that the setup wizard may also be used edit formats and other settings of an existing network site.

In block 340, document format criteria may be determined for the user network site, e.g., based on the user preferences and the format performance information. For instance, if the user has selected or otherwise expressed a preference for a two-column layout for a user blog, the server may determine the optimal formatting for an advertisement within a two-column format to achieve a maximum CTR (or other desirable performance attribute).

It should be appreciated that in cases where multiple ads are enabled for a webpage, each ad may have a different format. For example, for a given webpage format, an optimal collective CTR might be achieved for multiple ads in the webpage by displaying each ad in a different color and different position on the page, by displaying them side-by-side, in a bullet list, or in another format.

It should be appreciated that the document format criteria may be determined on an ongoing basis throughout the setup process. As new preference information is received, the document format criteria can be revised and re-determined. For example, the user may select a red three-column format with a large header. Based on these preferences, it may be determined that an optimal ad is a three-line text ad in the upper left corner of the page. However, the user may subsequently setup the middle column to display italicized bullet points. Based on the accumulated user preferences, it may be determined that an ad will achieve greater performance in a banner extending across the right side of the page.

It should also be appreciated that users may change their settings and preferences, e.g., at any time. New document format criteria may be determined based on each new user preference.

It should also be appreciated that in some embodiments a user may over-ride a suggested, "optimal" format. For example, if the server suggests placing ads in a 12-point font scrolling banner ad (e.g., to achieve formatting with an optimal CTR), the user may instead configure the ad as a 14-point ad in the upper left corner of the document. In some cases where the user chooses a less-than-optimal ad format, the resulting format may still be influenced by format preference information. For instance, the server may suggest only the top five ad formats for a given user preference, and the user may select among those five—all of which have desirable (although not necessarily optimal) performance. Thus, the ultimate format may still be based on format performance information because the available user selections throughout the site creation process (and/or formatting process) may be based on format performance criteria. In this way, the ultimate format for a document such as a webpage may still reflect document format criteria determined by the server based on format performance information during the format determination process.

In block 350, one or more concepts may be associated with the user network site based on keywords and/or content, e.g., content in (or otherwise associated with) the site. Concept association may occur automatically, e.g., by scanning the text of the site to identify dominant concepts. For example, if a user blog discusses milk and mentions the concepts of cows and milk several times, then the site may be associated with the terms milk and cows. In some embodiments, the user may identify keywords for association with the site (or portion thereof). For example, the user may identify the keyword "rock and roll" for a blog that focuses on local band performances. The user may also identify a keyword for a specific section of the site. For instance, if the same blog provides a weekly movie review at the bottom of a specific webpage, the bottom of the webpage may be associated with the keyword "movie." Keywords and other concepts associated with the site may be used for selecting documents such as advertisements for display on the site.

In block 360, a request for a document associated with the user network site may be received, e.g., by the server. For instance, when an entity such as a user requests a webpage of the network site, the content provider may request one or more advertisements for display in the website.

In block 370, one or more documents may be selected based on preference criteria and/or a relevance to the user network site. For instance, the server 2 may select one or more ads for display in the webpage, e.g., as requested by the entity in block 360. In some embodiments, ads may be selected based on their relevance to a keyword or content in the webpage. For example, if the website discusses milk (or if the keyword is "milk"), then one or more milk ads may be selected. In some embodiments, ads may be selected pursuant to an auction or other process as described in the patent applications incorporated herein. For example, selection may be based on a bid, cost per click, ad content, and other factors.

In block 380, one or more documents (e.g., the selected documents) may be output for display via the network site according to the determined document format criteria. For example, three selected advertisements may be output in the blog page to the requesting entity. The advertisements may appear on the webpage in the format determined in block 340. For example, if the document format criteria of block 340 specified an upper-left position and red color, then the three selected advertisements may appear in a red color in the upper-left portion of the blog page.

In block 390, a selection of at least one of the plurality of ads may be received. For instance, three milk-related ads may appear at the top-left of the webpage requested by the entity, and the entity may select the top-most ad. Performance information related to this ad and to its format may be recorded and processed. As new performance data is received and processed, different formats may be determined to be optimal. The site format may be modified according to the new performance information.

It will be appreciated, to those skilled in the art that the acts described herein may be performed by hardware, software, or a combination thereof, with or without human intervention, as may be embodied in one or more computing systems such as a server 2 system coupled to entities such as providers, associating entities, databases, and end users. Further, it should be appreciated that not all of the blocks need be accomplished. In other words, one or more of the actions may be skipped entirely in accordance with various embodiments of the invention. Also, it is not necessary that the action(s) of each block be performed in the order shown in FIG. 3. Any order of performance may be considered, and some of the actions may overlap in time with one or more other actions.

Illustrative User Interface and Results

Figure 4:
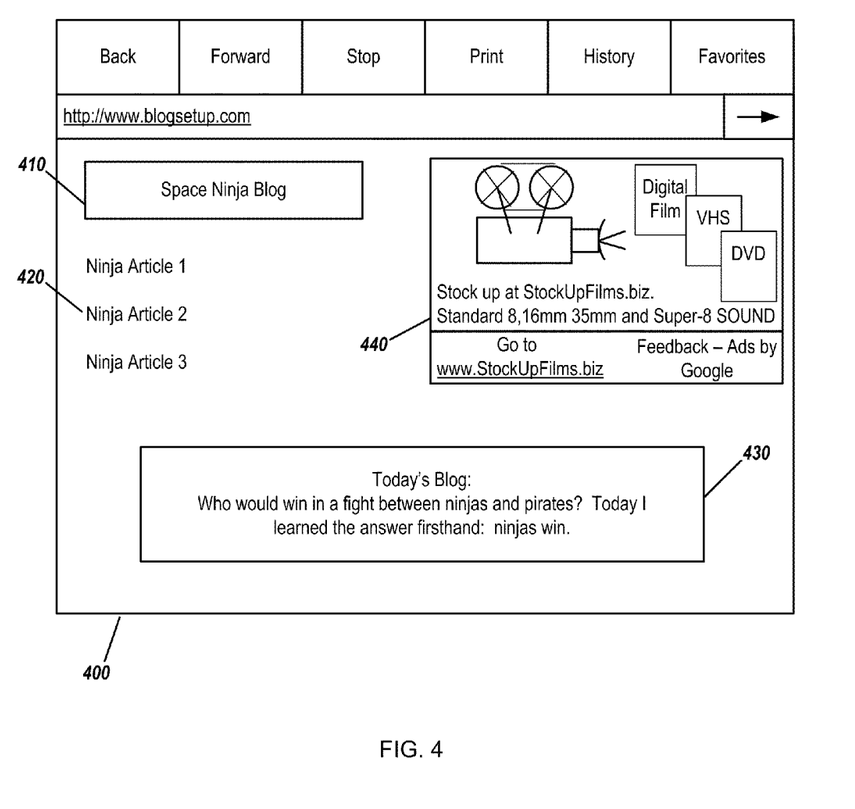
FIGS. 4-6 show exemplary webpages that may be output according to various embodiments of the invention.
Figure 5:
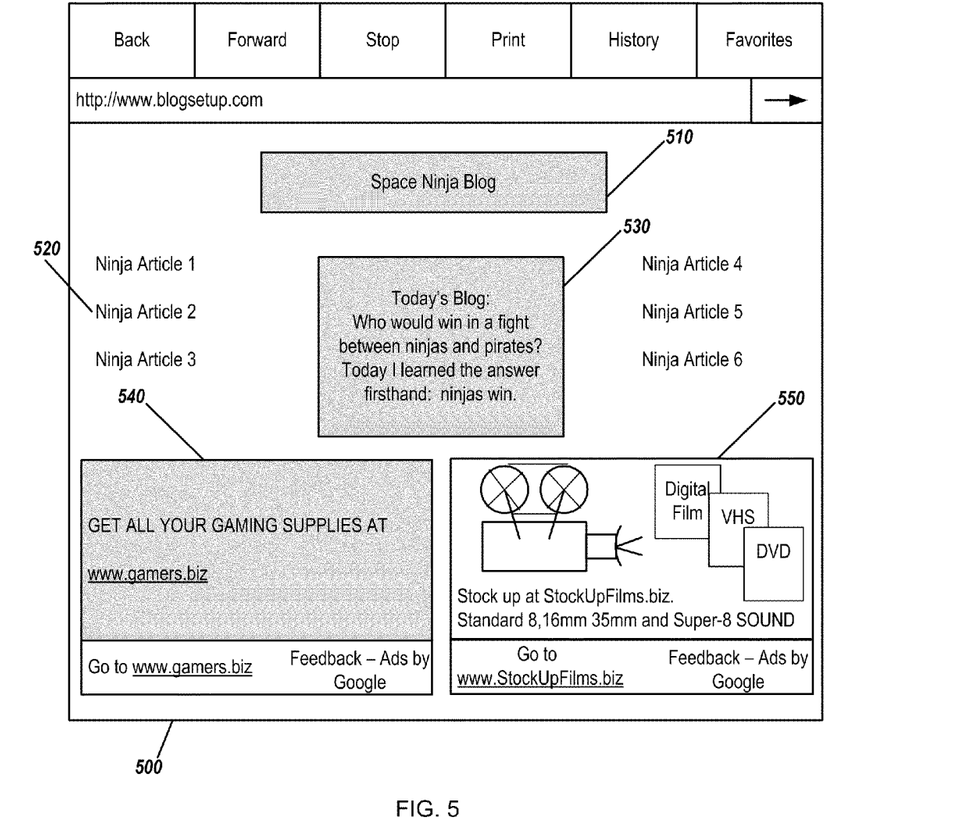
Figure 6:
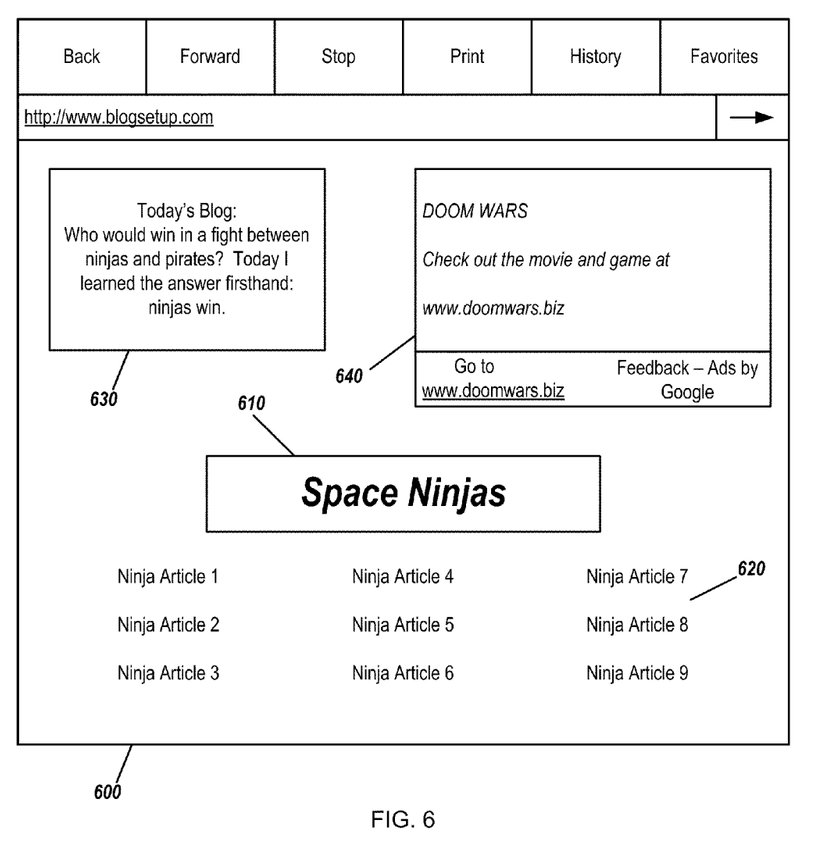

FIGS. 4-6 show exemplary webpages 400, 500, 600 that may be output according to various embodiments of the invention. These documents may be displayed during setup for a network site For example, exemplary webpages 400, 500, 600 may be displayed in a preview pane while a user adjusts various formatting parameters. The documents may also be displayed in accordance with determined format criteria. The documents may reflect various user preferences and determined format criteria, such as preferences and criteria that are established during setup of a network site such as a blog site. Each of FIGS. 4-6 shows different formats and format criteria that may be determined during setup, based at least in part on user preferences and format performance information. The arrangement, size, color, font, and other formatting features of objects in each document may reflect such determined format criteria.

For example, FIG. 4 shows an exemplary webpage 400 comprising a title 410, content objects 420 such as text articles, a text object 430 such as a blog entry, and an advertisement 440. The arrangement, size, color, and other formatting features of objects 410-440 may reflect a user's preferences and/or format performance information. For example, in this document 400 the title 410, content objects 420, and text objects 430 may reflect sizes and relative positions specified by the user during setup. For example, the relatively small title 410 is in the upper-left of the page while the text blog entry 430 extends across the bottom of the page. The position (and other formatting features) of the ad 440 may reflect an optimal ad position and format based on ad performance information, e.g., for ads displayed in pages having a similar arrangement of title 410, content objects 420, and text objects 430. In other words, the format of the ad 440 may reflect a determination by the server 2 that the format of this ad 440 is the optimal format under the user-specified preferences regarding the title 410 and other objects.

FIG. 5 shows a different webpage 500 having a different format and comprising a title 510, content object 520, text object 530, a first ad 540, a second ad 550. This different format may reflect a different set of user preferences and a corresponding format suggestion based on the user preferences and format performance information. For example, the user may have specified a three-column format with text object 530 in a middle column and two content object columns 520 in two side columns. Based on this preference information, server 2 may produce webpage 500 showing a title at the top and two ads at the bottom. The two ads may (or may not) reflect a user request to have two ads on the page. The placement of the ads 540, 550 at the bottom of the page may reflect a determination that, under these user constraints, the ads will be most effective at the bottom of the page.

The dark shading (or dark color) of the first ad 540 may reflect a determination that an effective ad on the left side of the page should have similar shading (or color) as the text object 530 and title 510. The second ad 550 may be un-shaded (or un-colored) to reflect a determination that if a left-hand ad is shaded the same as a two central objects, then a right-hand ad should have a different (e.g., un-shaded) shading scheme.

FIG. 6 shows yet another exemplary document 600 comprising a title 610, content objects 620, text objects 630, and ad 640. Here, it may have been determined that the ad 640 should optimally have a similar text format to the title 610. Because the title 610 is bold and italicized, it may be determined that the ad 640 should also be bold and italicized.

It should be appreciated that the formats of these documents 400-600 may reflect any preference and any set of document performance criteria (which may in turn be based on preferences and format performance information).

In some embodiments, any of documents 400, 500, 600 may reflect a default "optimal" format, absent any user preferences. The user may then re-configure the page according to the user's preferences. With each new user configuration, the server 2 may suggest additional formatting possibilities to enhance the performance of the document (e.g., a click through rate of an ad).

In some embodiments, any of documents 400, 500, 600 may reflect a "final" user network site. For instance, these documents 400-600 may substantially represent examples of documents that may be passed to a user who requests the webpage from the relevant user network site. The webpage may reflect determined document format criteria. For example, the ad(s) in each page may represent an optimal format for the ad.

It should be appreciated that while text and image advertisements are used as an example herein, the systems and methods described herein may apply equally to other types of documents, such as webpages, emails, and other electronic documents.

The embodiments of the present inventions are not to be limited in scope by the specific embodiments described herein. For example, although many of the embodiments disclosed herein have been described with reference to user blog pages, the principles herein are equally applicable to other documents, such as other websites, emails, videos, and other electronic documents and media. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims. Further, although the embodiments of the present inventions have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breath and spirit of the embodiments of the present inventions as disclosed herein.

The invention claimed is:

1. A computer-implemented method, comprising:
   receiving format preference information for a user network site;
   identifying format performance information for two or more candidate advertisement locations in the user network site,
      the format performance information for each of the two or more candidate advertisement locations including a first value specifying a number of user interactions with one or more advertisements that were previously positioned at the candidate advertisement location;
   selecting, by one or more processors and based on the format performance information for the candidate advertisement locations from the two or more candidate advertisement locations, first advertisement locations at which advertisements will be presented on the user network site;
   determining, by the one or more processors, a document format for the user network site based on the format preference information and the selected first advertisement locations;
   formatting, by the one or more processors, the user network site based on the document format,
      the formatting including setting, in code defining the user network site, a size of the first advertisement locations:
   determining, by the one or more processors, a difference between the first value specifying the number of user interactions included in the format performance information and a second value included in additional format performance information for each of the two or more candidate advertisement locations, specifying a second number of user interactions with one or more different advertisements that were previously positioned at the first advertisement locations;
   in response to determining the difference between the first value included in the format performance information and the second value included in the additional format performance information, dynamically adjusting, by the one or more processors, the document format based on the difference between the first value of the format performance information and the second value of the additional format performance information,
      wherein the dynamic adjustment includes changing, in the code defining the user network site, the size of at least one of the selected first advertisement locations,
         wherein the change to the size increases as the difference between the first value included in the format performance information and the second value included in the additional format performance information increases;
   after changing the size in the code defining the user network site, resizing, by the one or more processors, at least one advertisement to have dimensions matching the changed size of the at least one selected first advertisement location; and
   outputting, to a user device and over a communications network, computer executable instructions that initiate presentation, within the at least one selected first advertisement location at the changed size, of the at least one advertisement at the resized dimensions.

2. The method of claim 1, wherein dynamically adjusting the document format comprises: dynamically adjusting the document format based on changes to the format preference information and the format performance information; and reformatting the user network site based on the adjusted document format.

3. The method of claim 1, wherein:
   the format preference information comprises a size, color or layout of content on the user network site;
   the selected first advertisement locations are the candidate advertisement locations for which the format performance information is higher than format performance information for at least one unselected candidate advertisement location; and
   the format performance information for each of the two or more candidate advertisement locations include a click-through rate for one or more advertisements that were previously positioned at the candidate advertisement location on other network sites.

4. The method of claim 1, wherein the document format specifies at least one location of at least one advertisement relative to at least one object presented with the user network site.

5. The method of claim 1, wherein the document format specifies a timing of display for at least one object in the user network site.

6. The method of claim 1, wherein the format performance information comprises information computed based on a click through rate of one or more advertisements having a particular format attribute.

7. The method of claim 6, wherein the particular format attribute relates to at least one of a position, size, color, and a time factor related to display of the one or more advertisements.

8. The method of claim 1, wherein the user network site comprises a user webpage, and wherein the document format defines a template for displaying one or more advertisements with the user webpage.

9. The method of claim 1, further comprising: receiving a request for a document accessible a the user network site; and providing the document in response to the request, the document being provided according to the document format.

10. The method of claim 1, wherein the format preference information comprises information about a network site administrator's preference regarding the location of a plurality of electronic document objects on a webpage.

11. A computer-implemented method comprising:
receiving a request to format a user network site;
identifying, by one or more processors, format performance information for two or more candidate advertisement locations of the user network site, the format performance information for each of the two or more candidate advertisement locations including a first value specifying a number of user interactions with one or more advertisements that were previously presented at the candidate advertisement location;
selecting, by the one or more processors and based on the format performance information, first advertisement locations from the two or more candidate advertisement locations, each of the first advertisement locations having a specified size defined in code of the user network site; and
determining, by the one or more processors, a difference between the first value specifying the number of user interactions inmded in the format performance information and a second value, included in additional format performance information for each of the two or more candidate advertisement locations, specifying a second number of user interactions with one or more different advertisements that were previously positioned at the first advertisement locations;
in response to determining the difference between the first value included in the format performance information and the second value included in the additional format performance information, dynamically adjusting, by one or more processors, the specified size in the code of the user network site based on changes to the format performance information that result from user interactions with multiple different advertisements presented in the selected first advertisement locations;
after changing the size in the code defining the user network site, resizing, by the one or more processors, at least one advertisement to have dimensions matching the changed size of the at least one selected first advertisement location; and
outputting, to a user device and over a communications network, computer executable instructions that initiate presentation, within the at least one selected advertisement location at the changed size, of the at least one advertisement at the resized dimension.

12. The method of claim 11, wherein a document format of the user network site comprises a size, color or layout of content on the user network site.

13. The method of claim 12, wherein the document format specifies at least one location of at least one advertisement relative to at least one object presented with the user network site.

14. The method of claim 12, wherein the document format specifies a timing of display for at least one inject in the user network site.

15. The method of claim 12, wherein the user network site comprises a user webpage, and wherein the document format defines a template for displaying one or more advertisements with the user webpage.

16. The method of claim 12, further comprising: receiving a request for a document accessible at the user network site; and providing the document in response to the request, the document being provided according to the document format and including the selected advertisement.

17. The method of claim 11, wherein the format performance information comprises information computed based on a click through rate of one or more advertisements having a particular format attribute.

18. The method of claim 17, wherein the particular format attribute relates to at least one of a position, size, color, and a time factor related to display of the one or more advertisements.

19. The method of claim 11, wherein format preference information comprises information about a network site administrator's preference regarding locations of a plurality of electronic document objects on a webpage.

* * * * *